(12) United States Patent
Stech et al.

(10) Patent No.: US 9,925,835 B1
(45) Date of Patent: Mar. 27, 2018

(54) AUTOMATIC TIRE INFLATION SYSTEM WITH REMOVABLE AIR CONDUIT MEMBER

(71) Applicants: Clyde Stech, New Braunfels, TX (US); Robert Gao, Wharton, TX (US)

(72) Inventors: Clyde Stech, New Braunfels, TX (US); Robert Gao, Wharton, TX (US)

(73) Assignee: WHARTON VISION, LLC, Wharton, TX (US)

( * ) Notice: Subject to any disclaimer, the term of this patent is extended or adjusted under 35 U.S.C. 154(b) by 0 days.

(21) Appl. No.: 15/682,136

(22) Filed: Aug. 21, 2017

(51) Int. Cl.
| | | |
|---|---|---|
| *B60C 23/00* | (2006.01) | |
| *B60B 7/00* | (2006.01) | |
| *B60B 7/06* | (2006.01) | |
| *B60B 7/14* | (2006.01) | |
| *F16J 15/16* | (2006.01) | |
| *F16K 15/20* | (2006.01) | |

(52) U.S. Cl.
CPC .......... *B60C 23/003* (2013.01); *B60B 7/0013* (2013.01); *B60B 7/066* (2013.01); *B60B 7/14* (2013.01); *F16J 15/16* (2013.01); *F16K 15/202* (2013.01)

(58) Field of Classification Search
CPC ..... B60C 23/00; B60C 23/001; B60C 23/003; B60B 7/0013; B60B 7/002
See application file for complete search history.

(56) References Cited

U.S. PATENT DOCUMENTS

| | | | |
|---|---|---|---|
| 9,132,704 B2 * | 9/2015 | Wilson | B60C 23/003 |
| 9,221,308 B2 * | 12/2015 | Nelson | B60C 29/00 |
| 2004/0238093 A1 * | 12/2004 | Nelson | B60C 23/003 152/415 |
| 2006/0179929 A1 * | 8/2006 | Becker | B60C 23/003 73/146 |
| 2012/0305126 A1 * | 12/2012 | Merrill | B60C 23/003 141/1 |

* cited by examiner

*Primary Examiner* — Jason R Bellinger
(74) *Attorney, Agent, or Firm* — Culhane Meadows PLLC; Robert C. Klinger (57) ABSTRACT

An assembly for an ATI comprising a tube member forming a portion of a rotary union to be removed through an opening in a wheel hub without removing the wheel hub from the vehicle axle. The tube member may include a hardened shaft that is coupled to a fixed conduit providing a pressurized air source to a tire installed on the wheel hub. A bushing and seal rotates with respect to the tube member to form the rotary union. The assembly is designed to be quickly serviced in the field, where the serviceable parts are very inexpensive.

17 Claims, 13 Drawing Sheets

AUTOMATIC TIRE INFLATION SYSTEM WITH REMOVABLE AIR CONDUIT MEMBER

TECHNICAL FIELD

The present disclosure relates to automatic tire inflation (ATI) systems, including a field serviceable system.

BACKGROUND

Automatic tire inflation systems have been commercially available for many years. They are configured to maintain appropriate tire pressure in tires of commercial vehicles, including tractor trailers.

Commercial truck operators have struggled for years to balance the costs of ATI systems (ATIS) and associated servicing/repair labor and replacement parts with the benefits of the systems. To date, a majority of the commercial truck operators have not adopted ATI systems, in part because the benefits don't outweigh the costs and time. This is primarily due to the maintenance costs including labor and replacement parts, including shipping of parts, associated with maintaining the system over time, which can reach $400 or more present day. Moreover, pulling the trailer for service is a logistical issue.

Starting Jan. 1, 2018, the U.S. Government is implementing fuel credits to truck operators who implement ATI systems, and passive air pressure systems. The ATI systems will receive the larger credits.

An improved ATI system that is affordable, has an extremely low cost of maintenance, and that even enables others, such as drivers, owner/operators, or other repair persons to service the ATI system, would be highly advantageous to operators to reduce costs, and also to increase the adoption of ATI in the industry.

SUMMARY

An assembly for an ATI comprising a tube member forming a portion of a rotary union and configured to be removed through an opening in a wheel end without removing the oil/grease hub cap from the vehicle axle wheel hub. The tube member may include a hardened shaft coupled to a fixed conduit providing a pressurized air source to a tire installed on the wheel hub. A bushing and seal rotates with respect to the tube member to form the rotary union. The assembly is designed to be quickly serviced in the field, where the serviceable parts are very inexpensive.

DESCRIPTION OF EXAMPLE EMBODIMENTS

The following description of example embodiments provides information that enables a person skilled in the art to make and use the subject matter set forth in the appended claims, but may omit certain details already well-known in the art. The following detailed description is, therefore, to be taken as illustrative and not limiting.

The example embodiments may also be described herein with reference to spatial relationships between various elements or to the spatial orientation of various elements depicted in the attached drawings. In general, such relationships or orientation assume a frame of reference consistent with or relative to a patient in a position to receive treatment. However, as should be recognized by those skilled in the art, this frame of reference is merely a descriptive expedient rather than a strict prescription.

Figure 1:
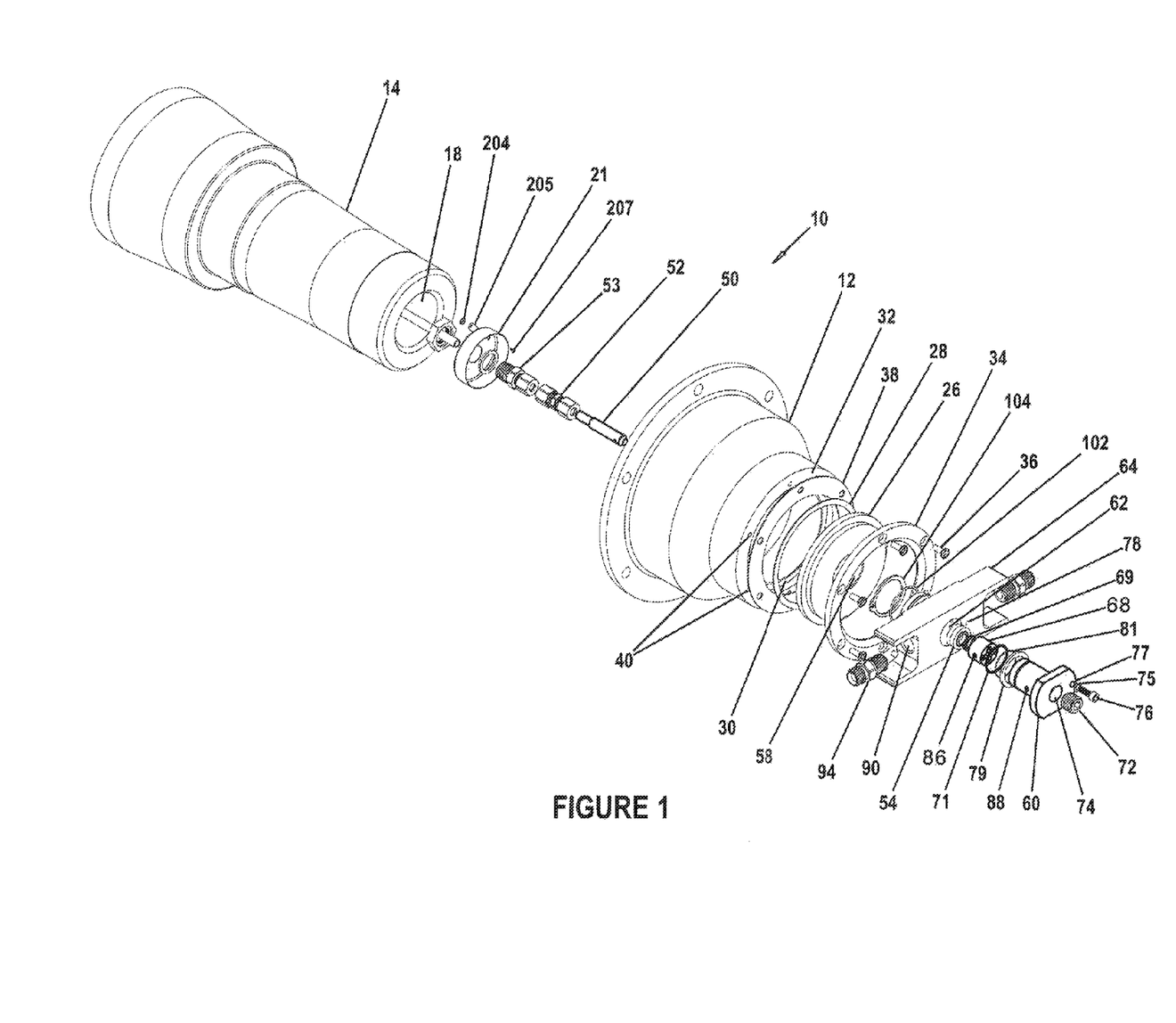
FIG. 1 illustrates an exploded sectional view of a hub cap and attached ATI system that is configured to rotatably couple to an axle and receive pressurized air from an air source.
Figure 2:
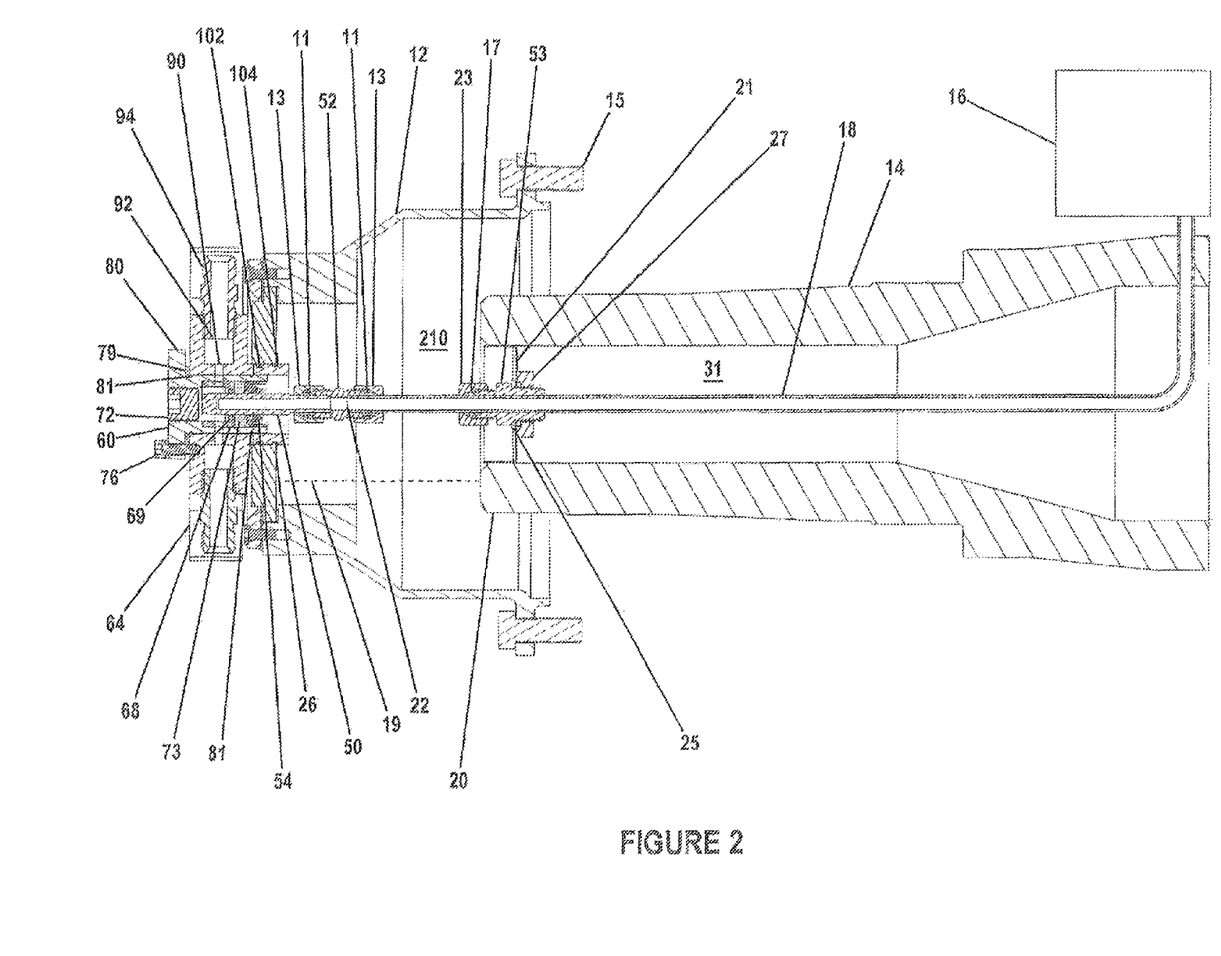
FIG. 2 shows an assembled side sectional view of the ATI system and hub cap assembly of FIG. 1.
Figure 3:
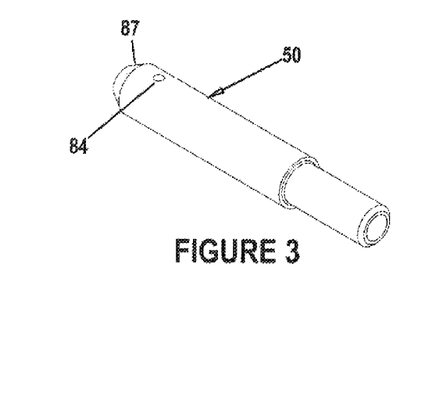
FIG. 3 illustrates a perspective view of the hard shaft.
Figure 4:
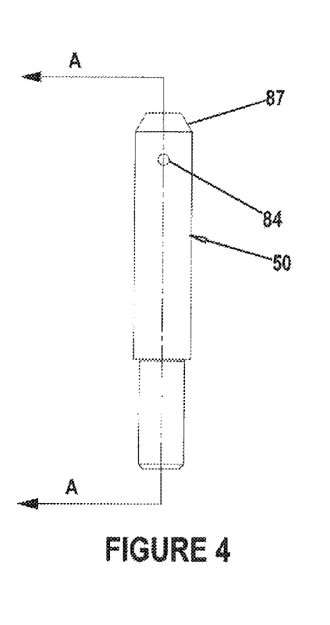
FIG. 4 illustrates a top view of the hard shaft of FIG. 3.
Figure 5:
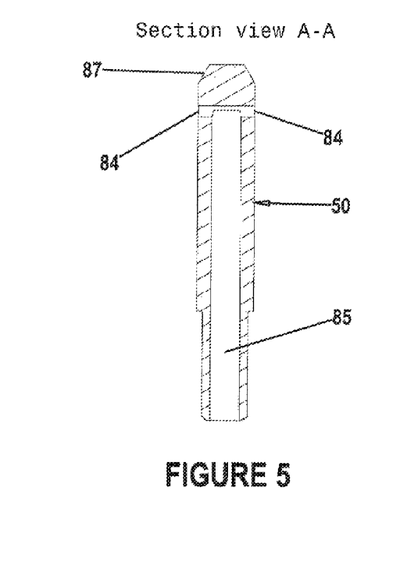
FIG. 5 illustrates a side sectional view taken along line A-A in FIG. 4.
Figure 6:
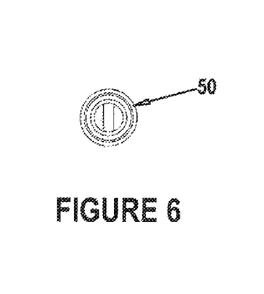
FIG. 6 illustrates an end view of the hard shaft.
Figures 7, 9:
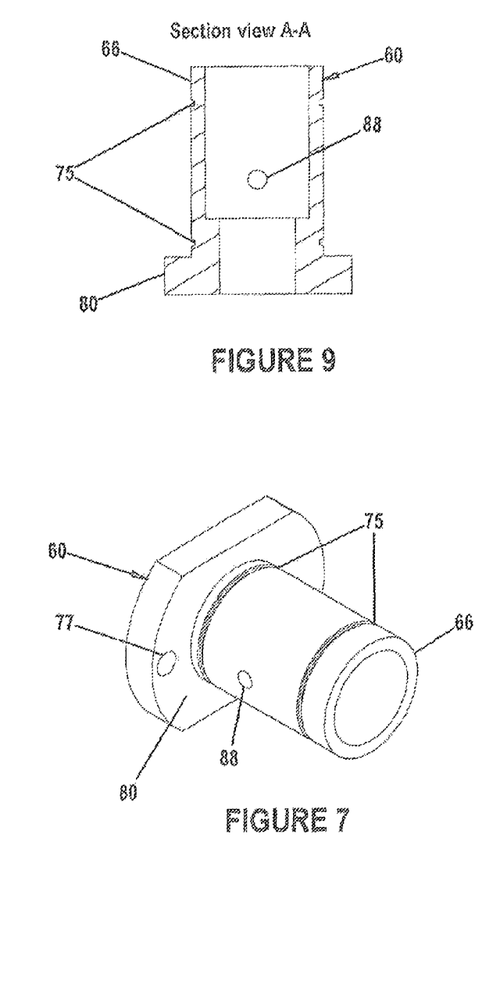
FIG. 7 illustrates a perspective view of the sealing plug.
FIG. 9 illustrates a side sectional view taken along line A-A in FIG. 8.
Figure 8:
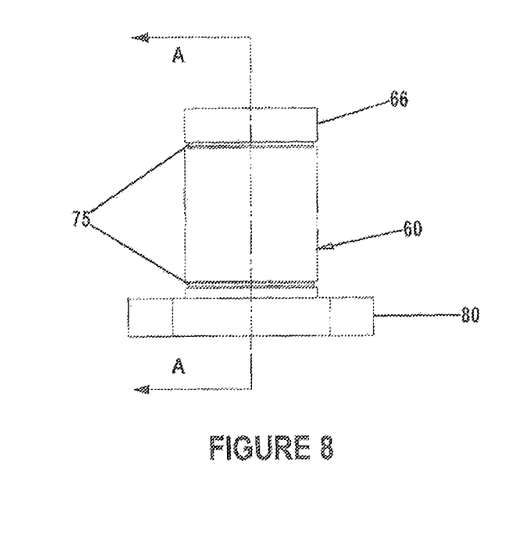
FIG. 8 illustrates a top view of the sealing plug of FIG. 7.
Figure 10:
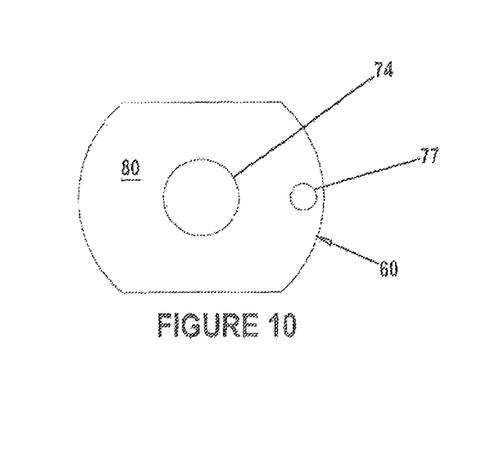
FIG. 10 illustrates an end view of the sealing plug.
Figure 11:
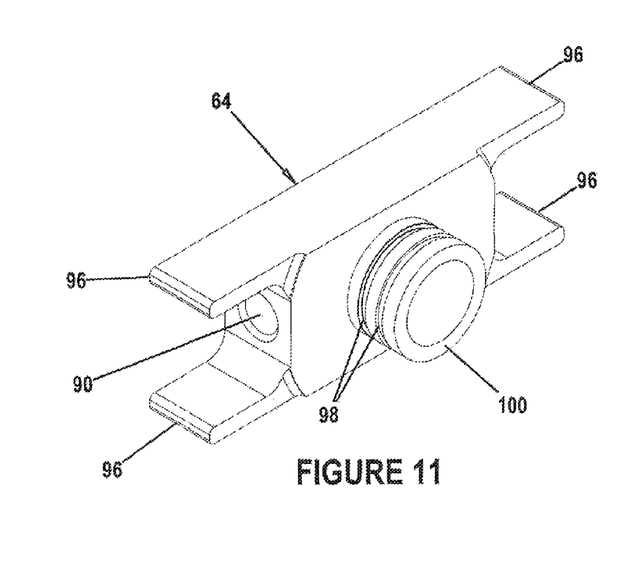
FIG. 11 illustrates a perspective view of the rectangular block.
Figure 12:
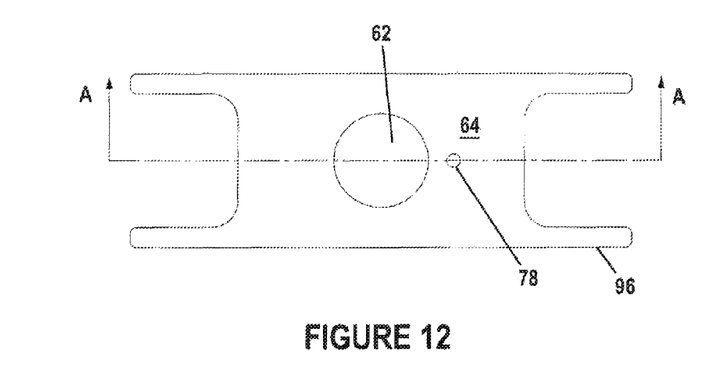
FIG. 12 illustrates a top view of the rectangular block of FIG. 11.
Figure 13:
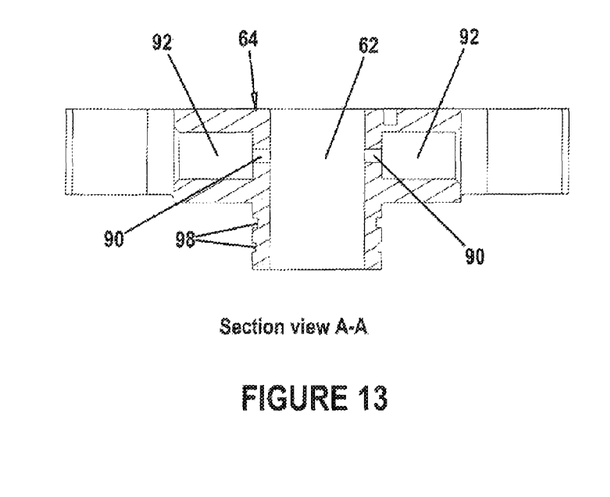
FIG. 13 illustrates a side sectional view taken along line A-A in FIG. 12.
Figure 14:
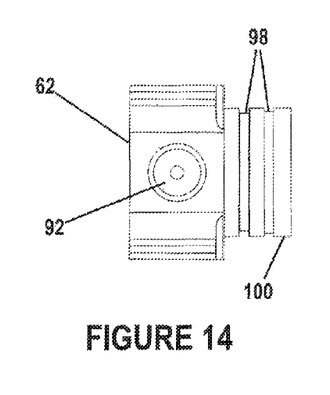
FIG. 14 illustrates an end view of the rectangular block.
Figure 19:
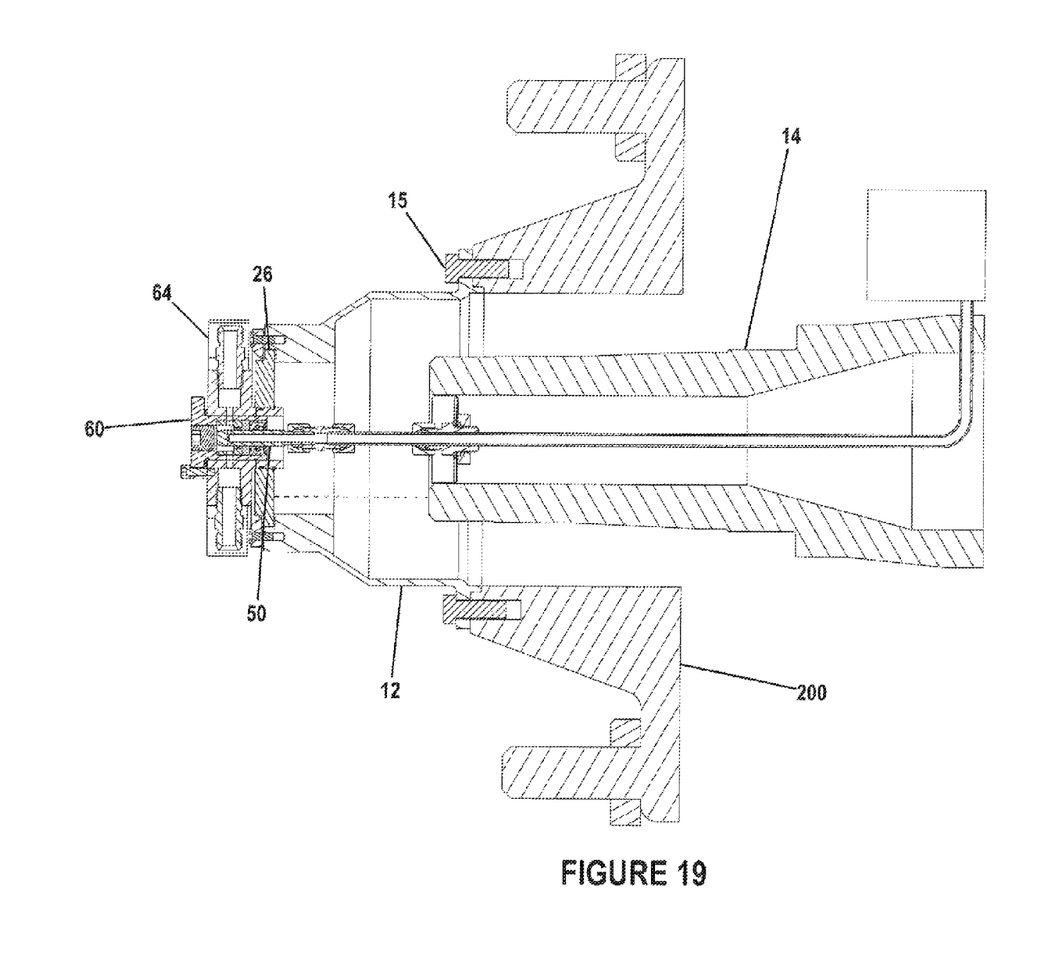
FIG. 19 illustrates an assembled side sectional view of the axle, wheel hub, oil/grease hub cap and ATI system parts.

Referring to FIGS. 1, 2, & 19, there is shown an ATIS assembly generally at 10 having an oil/grease hub cap 12 that is configured to rotatably couple to a wheel hub 200 and receive pressurized air from an air source 16. Bolts 15 fasten the oil/grease hub cap 12 to the wheel hub 200. An oil fill line is shown at 19.

A conduit 18 is configured to route the pressurized air from the air source 16 through an axle 14, extends through a freeze plug 21 disposed in an open end 20 of the axle 14 and terminates at a distal end 22 forming an air delivery port within the oil/grease hub cap 12. A circular disk 26 comprised of a transparent window or solid circular aluminum is coupled to the end of the oil/grease hub cap 12, where a seal 28 is sandwiched between an annular face of the disk 26 and an inside annular face 30 recessed in the oil/grease hub cap 12.

The disk 26 is secured to an outer annular face 32 of the oil/grease hub cap 12 by an annular open retainer 34 by fasteners 36, where a gasket 38 is sandwiched between the window retainer 34 and the outer annular distal face 32 of the oil/grease hub cap 12. The fasteners 36 are received in corresponding threaded holes 40 defined in the outside annular face 32. The disk 26, seal 28, retainer 34, fasteners 36 and gasket 38 together form a sealed arrangement. Seal 28, gasket 38, retainer 34 and fasteners 36 are all standard on an industry standard cap. Disk 26 is a transparent window if the hub cap & wheel hub requires oil, and it is an aluminum disk if the hub cap & wheel hub requires grease. Therefore, cap 12 is referred to as an oil/grease hub cap and member 26 is referred to as a disk.

One technical advantage of this disclosure comprises a removable hard shaft 50, as shown in FIGS. 3-6, forming a portion of the air delivery path that is configured to be selectively removed from the assembly 10 without having to remove the oil/grease hub cap 12. This can be quickly and easily done in the field, and is a very inexpensive part. The hard shaft 50 is preferably chromed because of the high Rockwell hardness rating. Although this is a more expensive process, the life of the hard shaft 50 is significantly increased and worth the cost, and also because the cost of other serviceable parts is very inexpensive. There is less wear on the hard shaft 50 and the radial seal 54 because the finished surface has less wear on the seal and shaft.

The distal end of hard shaft 50 comprises part of a rotary union. A tubular compression union 52 and compression fitting 53 is interposed between the proximal end of the hard shaft 50 and conduit 18.

As shown in FIGS. 1-2, a radial seal 54 seals against hard shaft 50, and within a sealing plug 60, as shown in FIGS. 7-10. The sealing plug 60 extends through an opening 62 formed in a rectangular rotator 64, as shown in FIGS. 11-14, and has a proximal end 66 extending through opening 58 of disk 26. A bushing/bearing 68 including the proximal/inbound radial seal 54 encompasses a distal end of the hard shaft 50 and is encompassed within the sealing plug 60, and forms the rotary union within the sealing plug 60 as well as the rectangular rotator 64. A threaded pipe plug 72 is threadably received within threaded recess 74 forming an opening in sealing plug 60. When the threaded pipe plug 72 is removed by a user, this allows the user to quickly and easily access and inspect the hard shaft 50 through the opening 74. The thickness of the transparent window/aluminum circular disk 26 is thicker than industry standard because it has to support the rectangle rotator 64. Snap ring 104 and grease pocket 73 are enclosed within sealing plug 60. Additionally, when the pipe plug 72 is removed, a user can shine a light into opening 74 to determine if the hard shaft 50 is in the correct placement. The sealing plug assembly 60, when removed by user, allows the user to selectively remove the hard shaft 50 through the opening 62 in the rectangular rotator 64. A pair of annular recesses 75 are formed near the flange portion 80 and at the distal end of sealing plug 60 and receive o-rings 81 which seal against the inside wall of opening 62 in rectangular rotator 64. A fastener 76 extends through opening 77 of the sealing plug 60 and into threaded opening 78 of the rectangular rotator 64 to align and secure radial openings 88 of sealing plug 60 to openings 90 of the rectangular rotator 64. A plastic washer 79 receives the distal end of sealing plug 60 and is sandwiched between a flange portion 80 at the distal end of sealing plug 60 and rectangular rotator 64 about opening 62.

As shown in FIGS. 1, 3-6, 20-22, a distal end 87 of the hard shaft 50 includes radial openings 84 each radially extending from an elongated central passageway 85 to the exterior of the hard shaft 50. Pressurized air is communicated from the air source 16 and conduit 18 via passageway 85 and through openings 84 to provide fluid communication of pressurized air to radial openings 86 formed in bushing/bearing 68, then radial openings 88 formed in sealing plug 60, and then via radial openings 90 formed in rectangular rotator 64 to cavity 92. Air supply fittings 94 are received in cavity 92 and are configured to couple the pressurized air from cavity 92 via hoses (not shown) that are fluidly coupled to air valve stems of respective tires (not shown). Openings 86, 88, and 90 are all axially aligned, such as by fastener 76. In addition, the openings are aligned by pressing the bushing/bearing 68 into the sealing plug 60 and then drilling a hole by placing a drill into opening 88 and drilling a hole into bushing/bearing 68 to make them align. Opening 88, and thus opening 86, will automatically align with opening 90 when installed.

Referring to FIGS. 3-6 & 22, the distal end 87 of hard shaft 50 is tapered, and includes openings 84. The tapered distal end 87 helps the sealing plug 60 receive the hard shaft 50 and align properly. A recess 89 formed in the distal end of bushing/bearing 68 allows the air to circulate from openings 84 around the hard shaft 50 to allow continuous air access to flow through openings 80, 88, and 90. This same outcome can be achieved by forming a recess in hard shaft 50 about openings 84, similar to recess 89.

Referring to FIGS. 11-14, the rectangular rotator 64 has extensions 96 extending each side of cavity 92 to protect air supply fittings 94 from damage. A pair of annular recesses 98 are formed in cylindrical portion 100 to receive respective o-ring 102 and snap ring 104 which provide a seal between the cylindrical portion 100 and the disk 26. Advantageously, the rectangular rotator block 64 forms an air distribution member that is rotatable with respect to the oil/grease hub cap 12 such that a distance from the cavities 92 to tire valve stems of two tires is selectively adjustable based on the position of the rectangular rotator block 64. Thus, when a tire(s) is installed on the wheel hub 200, and the oil/grease hub cap 12 is bolted via bolts 15 to the wheel hub 200, the rectangular rotator block 64 can be rotated as needed to establish the distance and allow the connection of the air hoses from each of the cavities 92 via the air supply fittings 94 to the tire valve stems, without having to reposition the tire and wheel.

Referring back to FIGS. 1-2, the compression union 52 and the compression fitting 53 will now be described in further detail. A metal ferrule 11 is positioned in each side of compression union 52, and is encompassed by a respective ½" compression fitting nut 13 to seal the compression fitting 52 against the conduit 18 and about the end of hard shaft 50 forming the union with distal end 22 of conduit 18. A non-metal ferrule 17 is also positioned over a distal end of compression fitting 53, and a ⁹⁄₁₆" compression fitting nut 23 seals the compression fitting 53 about a midsection of the conduit 18 within the freeze plug 21. The use of a non-metal ferrule allows repositioning of the conduit 18 at a later time if needed. A plastic washer 25 extends around the compression fitting 53, and a lock nut 27 is tightened about compression fitting 53 to seal and prevent oil from entering back into a cavity 31 of axle 14. The freeze plug 21 seals the distal end 20 of axle 14, such that axle cavity 31 is sealed from the cavity within the oil/grease hub cap assembly.

Figure 15:
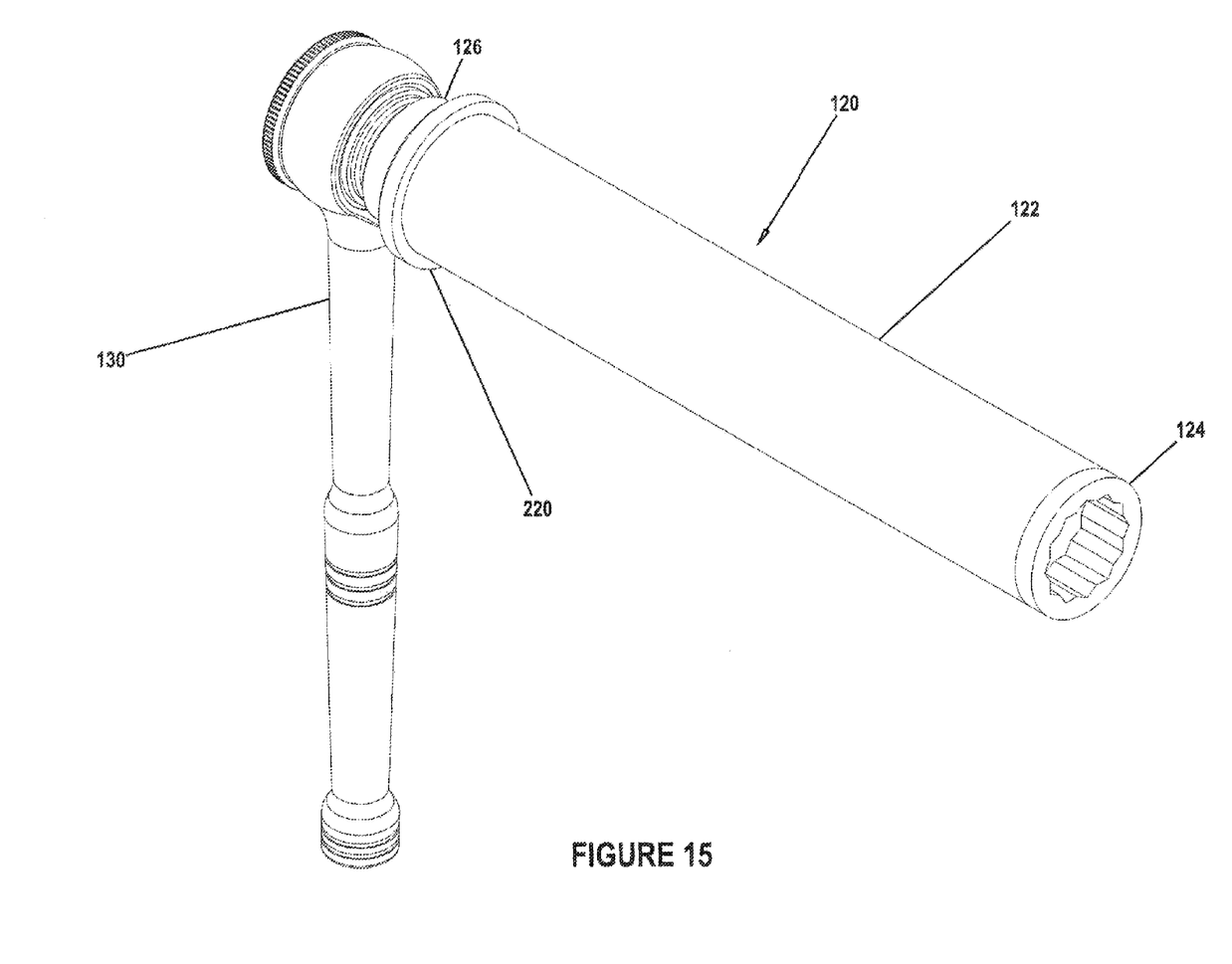
FIG. 15 illustrates a perspective view of an installation tool.
Figure 16:
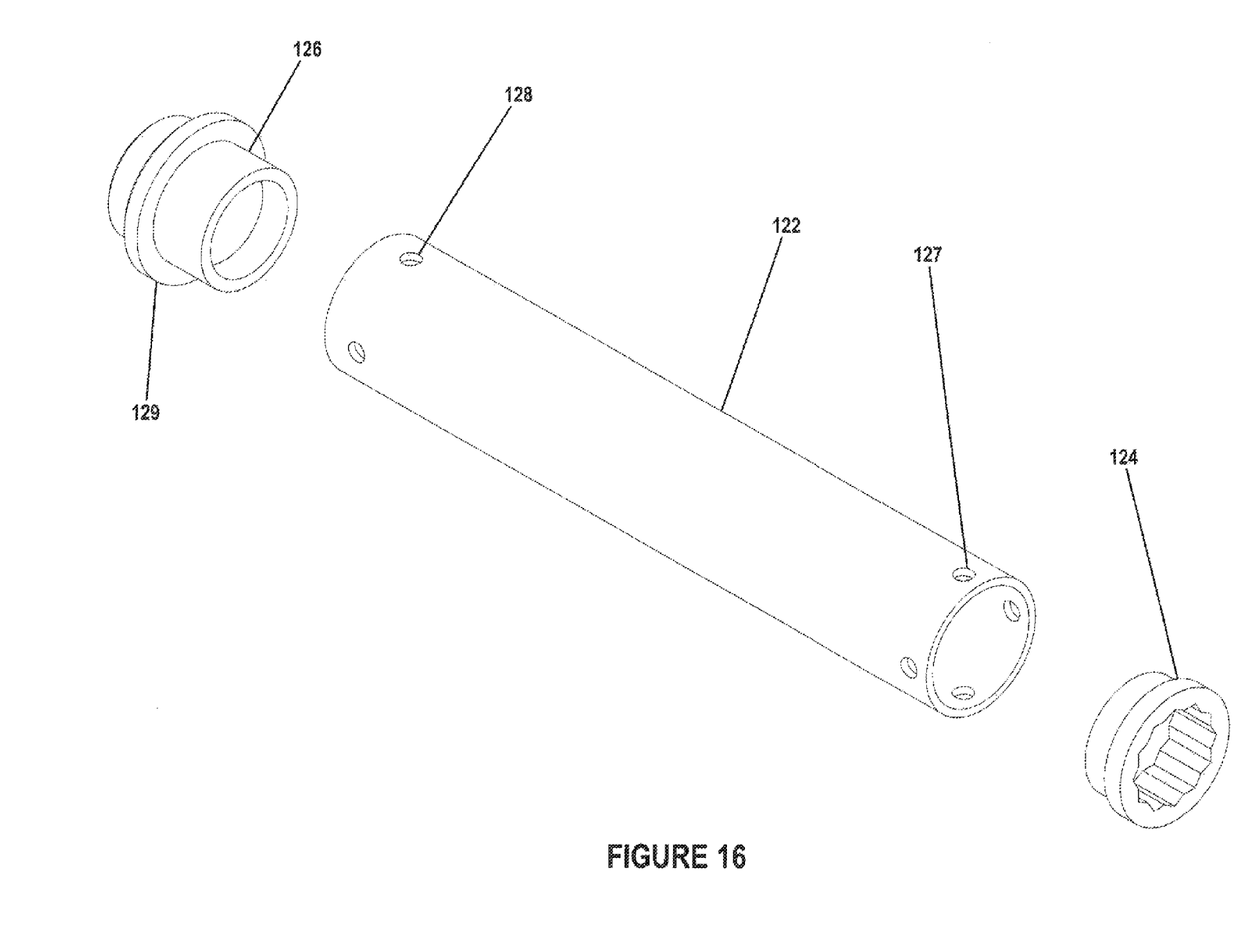
FIG. 16 illustrates an exploded view of the installation tool of FIG. 15.
Figure 17:
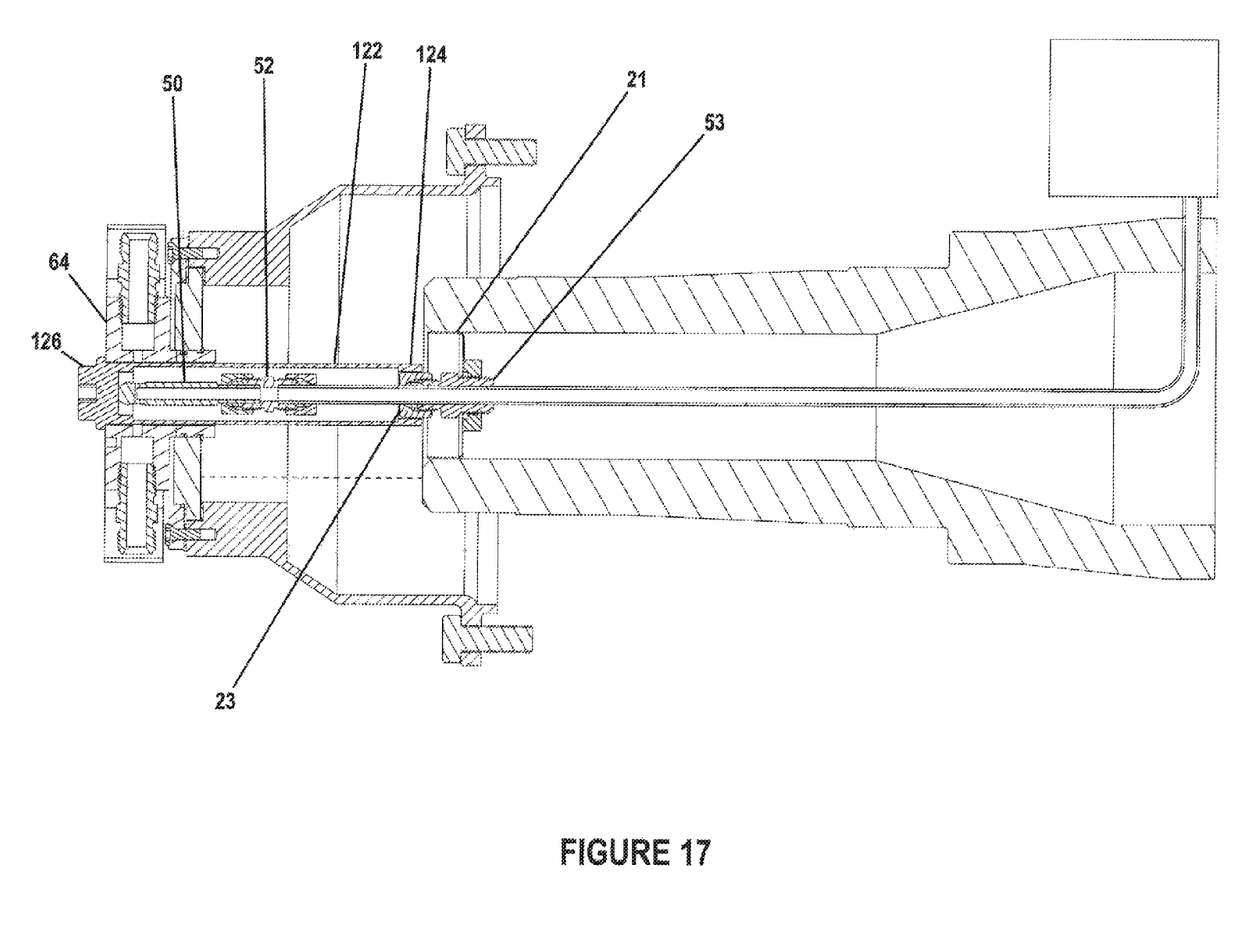
FIG. 17 illustrates the installation tool in use to service.

Referring now to FIGS. 15-17, there is shown an installation tool at 120 configured to facilitate servicing or installation of the hard shaft 50 from within the ATIS assembly 10 and oil/grease hub cap 12, without having to remove the oil/grease hub cap 12. An elongated tube 122 has a ⁹⁄₁₆" hex socket 124 at the inboard end, and a ¼" drive flanged socket head 126 at the outboard side and socket collar 129. The three pieces are joined by rosette welding or pins via 4 pre-drilled holes 127 & 128 in the tube 122 on either end. The tool 120 is configured to be driven by a convention ratchet 130.

As shown in FIG. 17, servicing can be done in the field on the ATIS assembly 10 by a user. The user first uses an Allen wrench to remove the fastener 76 from the sealing plug 60.

Next, the sealing plug 60 is removed along with washer 79 from within the opening 62 formed in a rectangular rotator 64.

At this point, the tapered distal end 87 of hard shaft 50 is viewable through opening 62. A bright light can be used to visually inspect the hard shaft 50 for any radial wear on the shaft and determine if it needs to be replaced. The hard shaft 50 can be removed and replaced through opening 62 if necessary.

As shown in FIG. 17, using installation tool 120, the tube 122 is inserted by the user through the opening 62 such that the 9/16" hex socket 124 at the inboard end is positioned about the head of the compression fitting nut 23 formed about the compression fitting 53. The ratchet 130 can be used to rotate the tube 122 which allows a user to pull hard shaft 50 and the distal end of conduit 18 outside the opening 62 to replace hard shaft 50. This repair can be done without removing the oil/grease within hub cap cavity 210.

Figure 18:
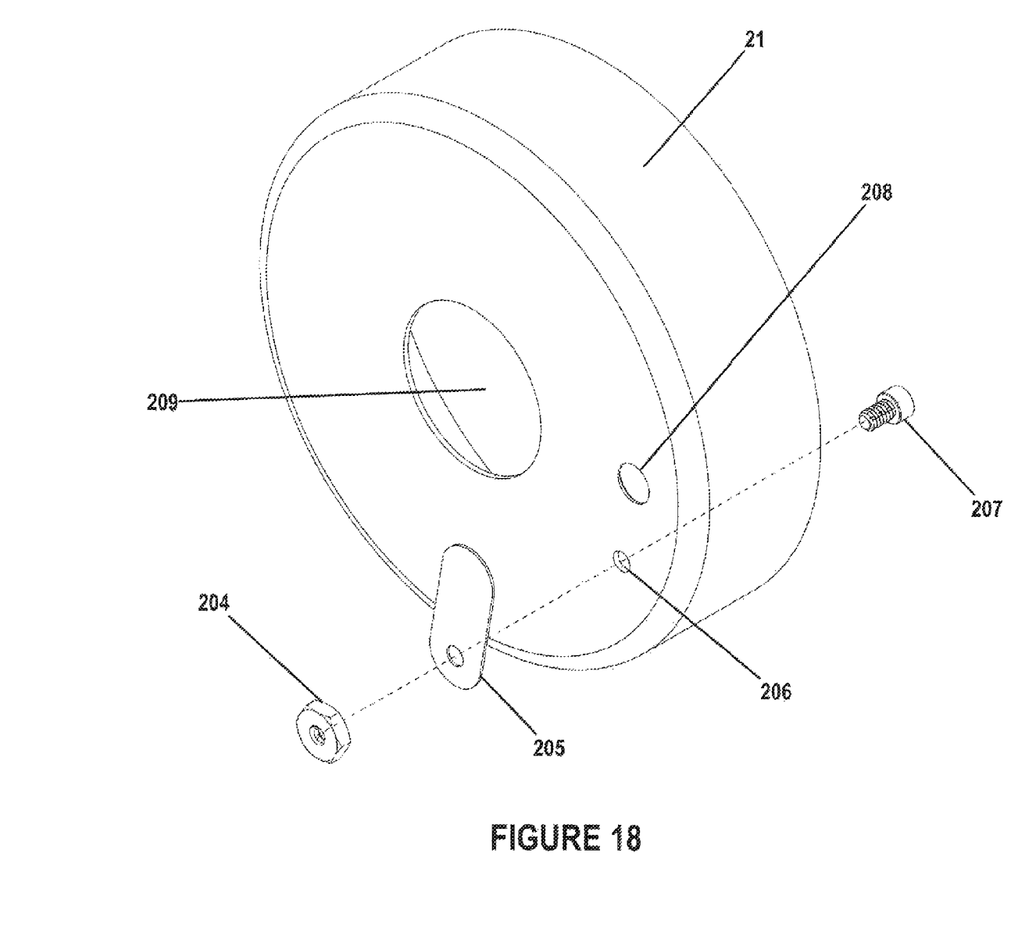
FIG. 18 illustrates the perspective view of the reed valve.

Referring now to FIG. 18, the freeze plug 21 has a reed valve assembly consisting of a nut 204, a reed valve 205, a fastener 207 and opening 208. A rivet could be used to replace the nut 204 and fastener 207 if desired. The reed valve 205 is positioned on a back side 203 of the freeze plug 21 over opening 208 and inside the axle cavity 31. The reed valve 205 acts as a one-way valve in that it allows leaked air from a hub cavity 210 to flow through opening 208 into the axle cavity 31 and escape through a breather at the top of the axle 14 (which is not shown). Due to the size of the opening 208, a large amount of air is able to escape thus keeping a lower air pressure in the hub cap cavity 210 to prevent a seal failure. The reed valve assembly also holds oil inside the oil hub cap cavity 210, shown at line 19, and prevents the oil from entering the axle cavity 31. Additionally, the reed valve assembly keeps trash in the axle cavity 31 from passing out to the hub cap cavity 210 that could contaminate the oil or grease in the cavity and cause catastrophic failure of the bearings which lead to other problems.

FIG. 19 illustrates a simplified assembled side sectional view of the axle, wheel hub, oil/grease hub cap and ATI system parts.

Figure 20:
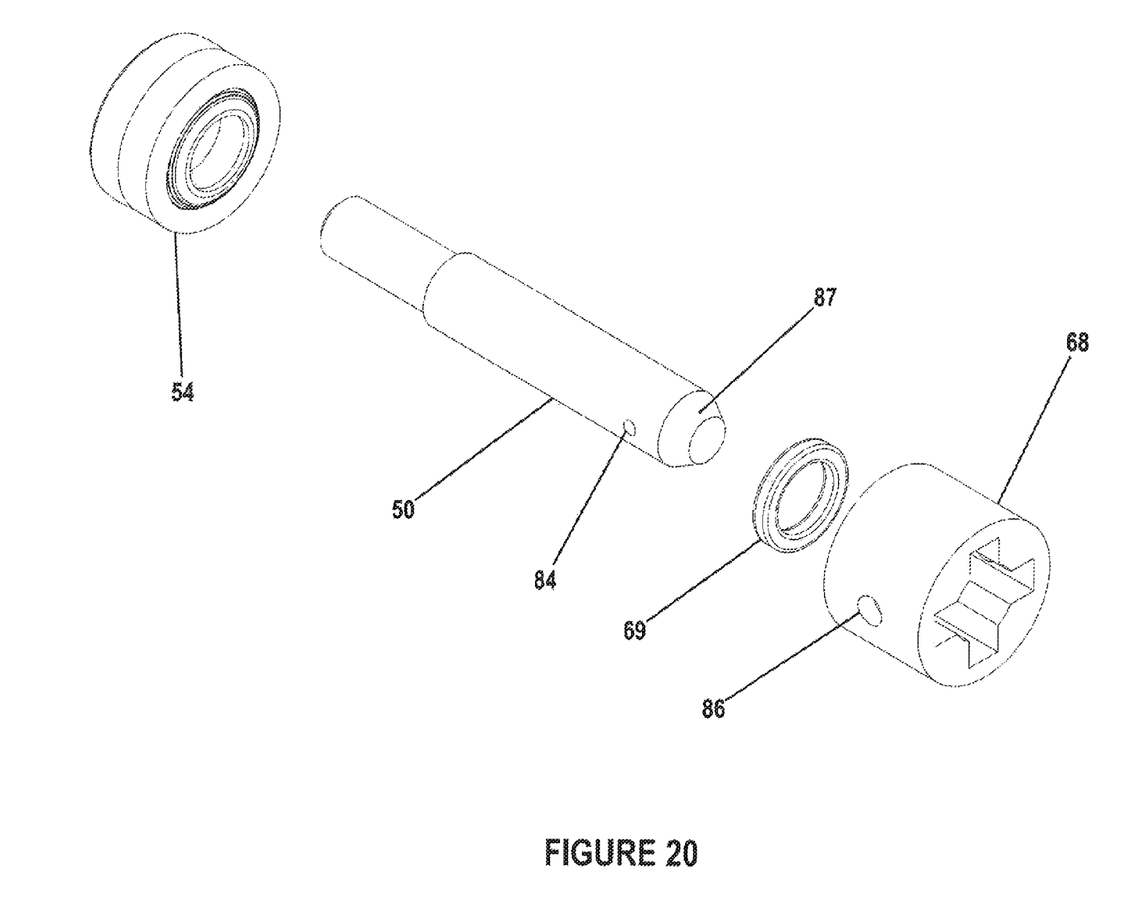
FIG. 20 illustrates an exploded view of the hard shaft and the bushing.

FIG. 20 illustrates an exploded view of the hard shaft 50 and the bushing 68 including seal 69.

Figure 21:
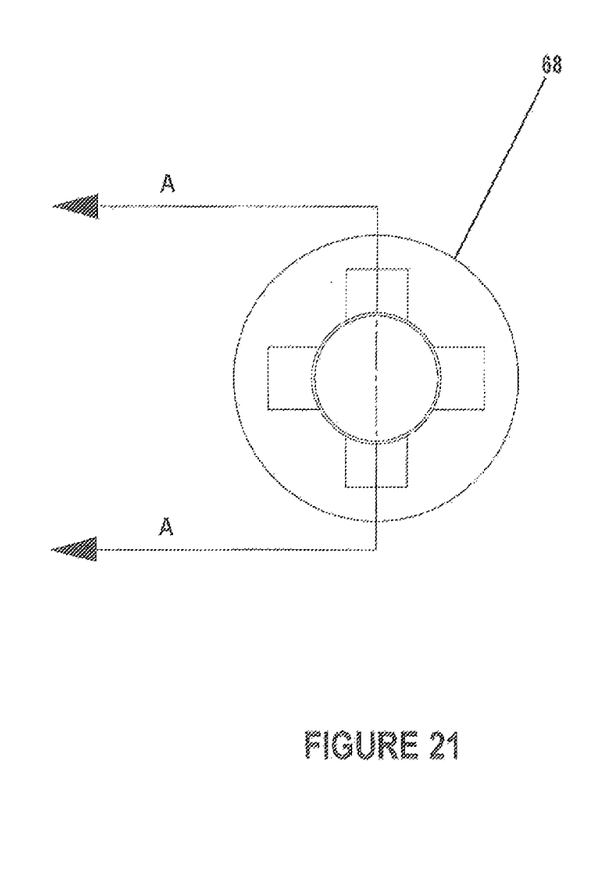
FIG. 21 illustrates a top view of the bushing.

FIG. 21 illustrates a top view of the bushing 68.

Figure 22:
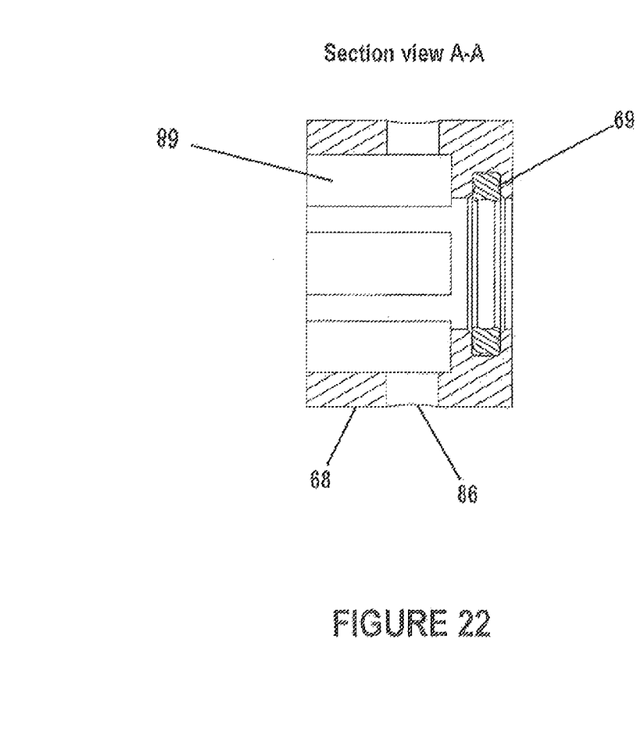
FIG. 22 illustrates a sectional view of the bushing taken along line A-A in FIG. 21.

FIG. 22 illustrates a sectional view of the bushing 68 taken along line A-A in FIG. 21.

Adjustable Shaft

The hard shaft 50 is connected to the conduit 18 that exits the top of the axle 14 and connects to the air source 16. The hard shaft 50 is connected to the compression union 52 so the shaft can be replaced when worn. This keeps the cost down for replacements parts. The hard shaft 50 is adjustable in that it is connected to the conduit 18 which has a segment extending distally beyond axle opening 20 that has an adjustable length. This conduit segment length is adjustable by using tool 120 to loosen the compression fitting nut 23 on the compression fitting 53, as previously described. This nut loosening releases the plastic ferrule 17 from the body of compression fitting 53 with less effort and allows the longitudinal movement/repositioning of the conduit 18. The adjustable shaft allows for the many different axle measurements in regards to the X Factor of the length/distance between the outbound outer edge 32 of the oil/grease cap 12 and the compression fitting 53 on the freeze plug 21. This disclosure allows the user to loosen the compression fitting nut 23 and adjust the length of the conduit segment distal axle opening 20 to properly fit the hardened shaft 50 in all axle hub configurations, so that one size of the hardened shaft 50 fits all installations.

Figure 23:
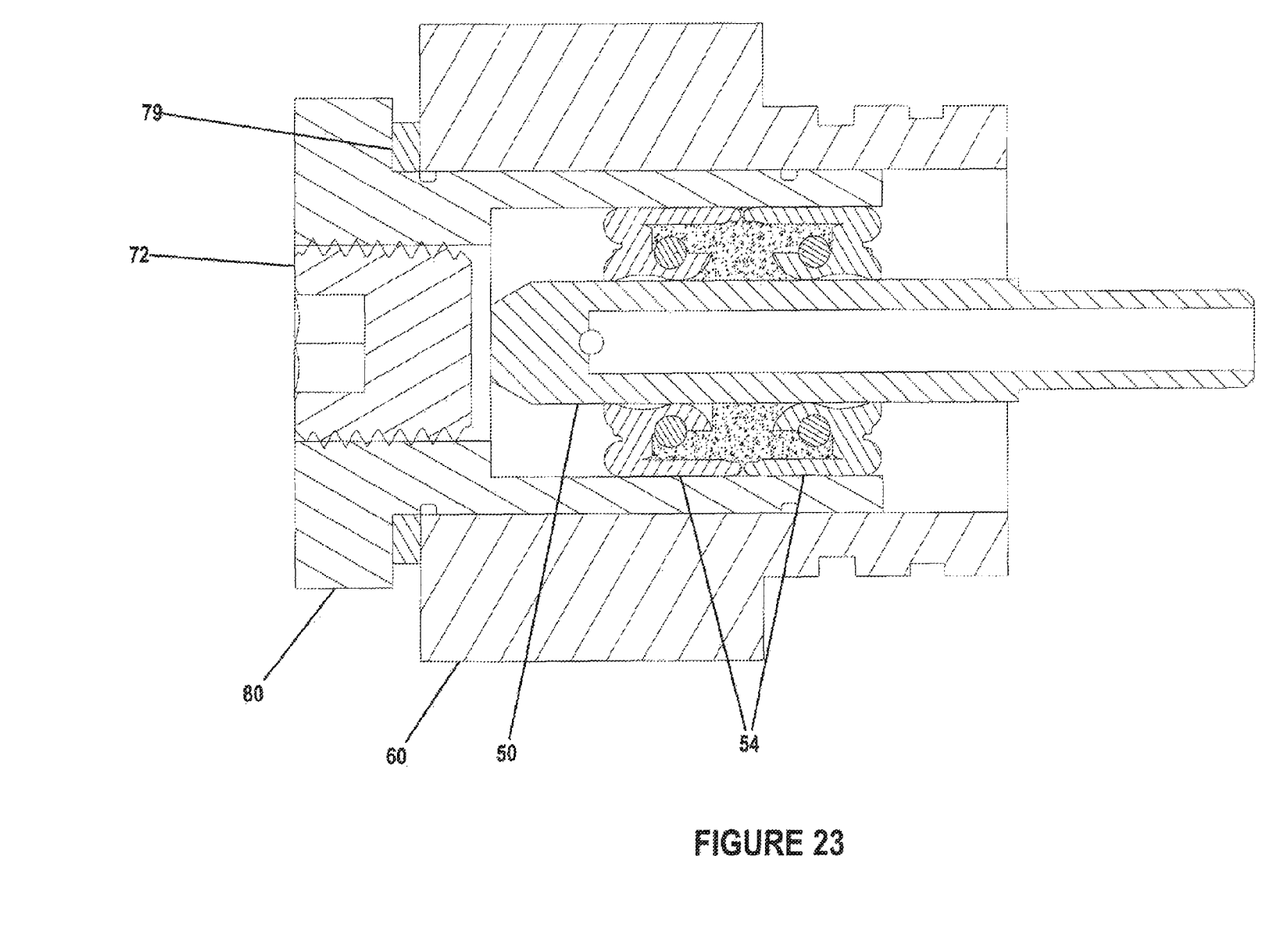
FIG. 23 illustrates an embodiment of two seals disposed about the hard shaft.

In another embodiment of the disclosure shown in FIG. 23, the bushing/bearing 68 could be replaced by adding a second outbound seal 54 in its place, where the inbound first seal 54 remains in the same position as shown in FIG. 1, FIG. 2, and FIG. 20. A grease/lube pocket is formed about hard shaft 50 in between the two seals 54. When pressurized, the inbound first seal 54 is the only seal that during rotation is sealing because the pressure pushes up against a lip of the first seal 54 to keep air from escaping between the lip and the hard shaft 50. Having the seals 54 face each other creates the grease/lube pocket that keeps the inbound first seal supplied with lubricant for longevity of the seal. The outbound second seal 54 faces towards the inbound first seal 54 is so that it is supplied with grease/lube to give it longevity in order to help the inbound first seal 54 which does all the work.

This disclosure has several advantages. The ATIS assembly 10 does not need to be completely disassembled to service a wear part, which is a huge cost and time savings. Spare parts can be provided in a control box of atrailer that is easily accessible by a user, such as a new hard shaft 50, compression union 52, compression fitting 53, and radial seal 54. The worn parts comprising hard shaft 50 and radial seal 54 are very inexpensive. Should a customer need additional parts, the shipping costs are minimal since the parts are fewer and thus less weight to pay for when shipped.

Moreover, a user doesn't have to drain oil or remove grease from hub cap cavity 210 during the servicing of the hard shaft 50, and thus a user doesn't have to refill oil or replace grease to repair, because the user does not have to remove the oil/grease hub cap as with other systems. This is a huge time savings and provides convenience.

There is a huge labor savings because others, such as driver, truck stop mechanics, etc. can repair this system 10 anywhere, as opposed to only the customer's company maintenance facilities. Therefore, there is less labor cost because there is less time to diagnose and repair versus other systems.

Each air conduit 18 leaving the control box 16 is independent of each other. This allows for better diagnostics if there are leaks by closing off one valve at a time (not shown).

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

The invention claimed is:

1. An assembly, comprising:
   a hub cap configured to couple to a vehicle wheel hub;
   a tube member disposed within the hub cap and configured to couple to an air source port, the tube member configured to communicate air pressure from the air source port; and
   a seal assembly coupled to the hub cap, the tube member forming a rotary union with the seal assembly, the seal assembly having a selectively removable member configured to create an opening in the seal assembly, the opening configured to allow the tube member to be withdrawn through the opening without removing the hub cap from the vehicle wheel hub.

2. The assembly as specified in claim 1 wherein the seal assembly comprises a removable cover configured to allow visual inspection of the tube member when removed.

3. The assembly as specified in claim 2 wherein the cover is axially aligned with the tube member.

4. The assembly as specified in claim 1 further comprising an air distribution member coupled to the seal assembly and having at least one distribution port configured to communicate pressurized air from the tube member to at least one tire coupled to the wheel hub.

5. An assembly, comprising:
a hub cap configured to couple to a vehicle wheel hub;
a tube member disposed within the hub cap and configured to couple to an air source port, the tube member configured to communicate air pressure from the air source port; and
a seal assembly coupled to the hub cap, the tube member forming a rotary union with seal assembly, the seal assembly being selectively removable from the hub cap to create an opening configured to allow the tube member to be withdrawn through the opening without removing the hub cap from the vehicle wheel hub;
further comprising an air distribution member coupled to the seal assembly and having at least one distribution port configured to communicate pressurized air from the tube member to at least one tire coupled to the wheel hub, wherein the air distribution member is rotatable with respect to the seal assembly such that a distance from the at least one distribution port to a tire valve stem of the at least one tire is selectively adjustable.

6. The assembly as specified in claim 4 wherein the tube member has an elongated passageway, and at least one opening radially extending through the tube member from the passageway and in fluid communication with the at least one distribution port.

7. The assembly as specified in claim 4 wherein the air distribution member is selectively removable from the seal assembly.

8. The assembly as specified in claim 4 wherein the seal assembly comprises a sealing plug extending through the air distribution member, the sealing plug selectively removable from the air distribution member.

9. The assembly as specified in claim 7 further comprising a bushing disposed in the sealing plug, wherein the bushing is rotatably coupled to the tube member and forms the rotary union.

10. The assembly as specified in claim 8, further comprising a fluid path extending from the tube member, through the sealing plug and the bushing, and in fluid communication with the at least one distribution port.

11. The assembly as specified in claim 8 wherein the tube member has a tapered distal end engaging the bushing.

12. The assembly as specified in claim 1 wherein the tube member is chromed.

13. The assembly as specified in claim 1 further comprising a first coupling configured to sealingly secure the tube member to the air source port.

14. The assembly as specified in claim 13 wherein the first coupling is a compression union.

15. The assembly as specified in claim 1 wherein the air source port comprises a conduit extending outwardly from a vehicle axle.

16. An assembly, comprising:
a hub cap configured to couple to a vehicle wheel hub;
a tube member disposed within the hub cap and configured to couple to an air source port, the tube member configured to communicate air pressure from the air source port; and
a seal assembly coupled to the hub cap and having a window, the tube member forming a rotary union with the seal assembly, the seal assembly having a selectively removable member configured to create an opening in the seal assembly, the opening configured to allow the tube member to be withdrawn through the opening without removing the window from the seal assembly.

17. The assembly as specified in claim 16 wherein the opening also extends through the window.

* * * * *